Aug. 26, 1952 — R. R. PROCTOR — 2,608,205
AUTOMATIC SAFETY VALVE CLOSURE SYSTEM
Filed March 21, 1946 — 2 SHEETS—SHEET 1

Inventor
Ralph R. Proctor
By Lyon & Lyon
Attorneys

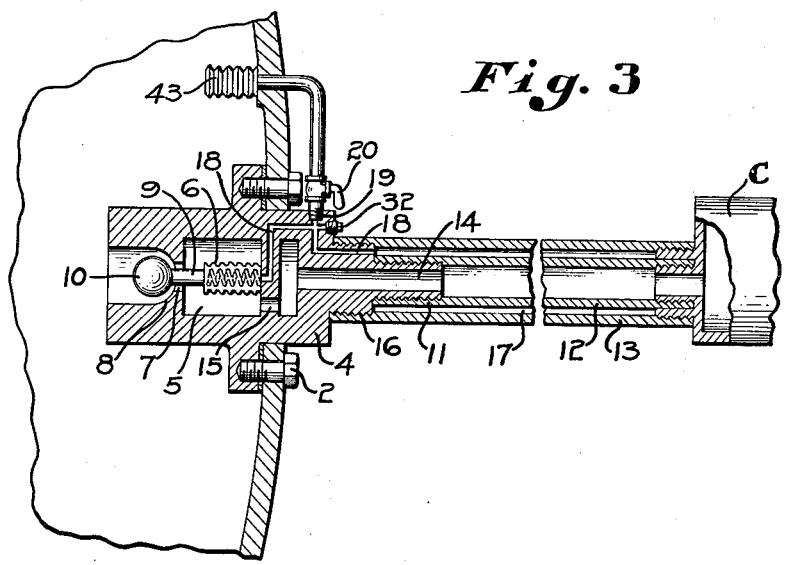

Patented Aug. 26, 1952

2,608,205

UNITED STATES PATENT OFFICE 2,608,205

AUTOMATIC SAFETY VALVE CLOSURE SYSTEM

Ralph R. Proctor, Glendale, Calif.

Application March 21, 1946, Serial No. 656,050

5 Claims. (Cl. 137—375)

My invention relates in general to means for automatically closing fluid pressure systems wherein for any reason the loss of fluid resulting from breakage or excess leakage from the fluid pressure systems is undesirable as, for instance, the danger of fire or explosion in connection with the delivery of butane gas from a tank to a motor or to another storage tank by means of a hose or metal pipe line in case of leakage or breakage of the hose or pipe line. The terms "butane" and "water" as used herein shall be understood to include fluids, gases or vapors under pressure or vacuum that are being transported from one place to another or being used to transmit force or energy.

Butane under even slight pressure is highly volatile and gasifies immediately upon the pressure being released. It is very inflammable and when released in clouds of gas, forms an extremely explosive mixture. At present a good many trucking companies are using butane as a fuel and as a result, there have been many explosions due to breakage or leakage of the fuel line from the butane tank to the carburetor or atomizer on the engine. It is, therefore, an object and advantage of my invention to provide a valve which will automatically cut off the flow of the butane from the supply tank through the delivery pipe to the engine whenever the delivery pipe is broken or springs a leak.

Another object of my invention is to provide a valve which will shut off the butane from the supply pipe whenever the ignition switch on the vehicle is shut off.

Another object and advantage of my invention is to supply a valve which may be used on the supply tank in service stations to shut off the flow of butane from the supply tank to the delivery pipe used to fill a vehicle's tank. When that supply line is either closed at its outer extremity or is in any way punctured or broken, my valve automatically closes.

Other objects and advantages of this invention will be apparent from the following detailed description of a preferred embodiment thereof as illustrated in the accompanying drawings.

In the drawings:

Figure 3 is a section of a modification of my invention.

Figure 1:
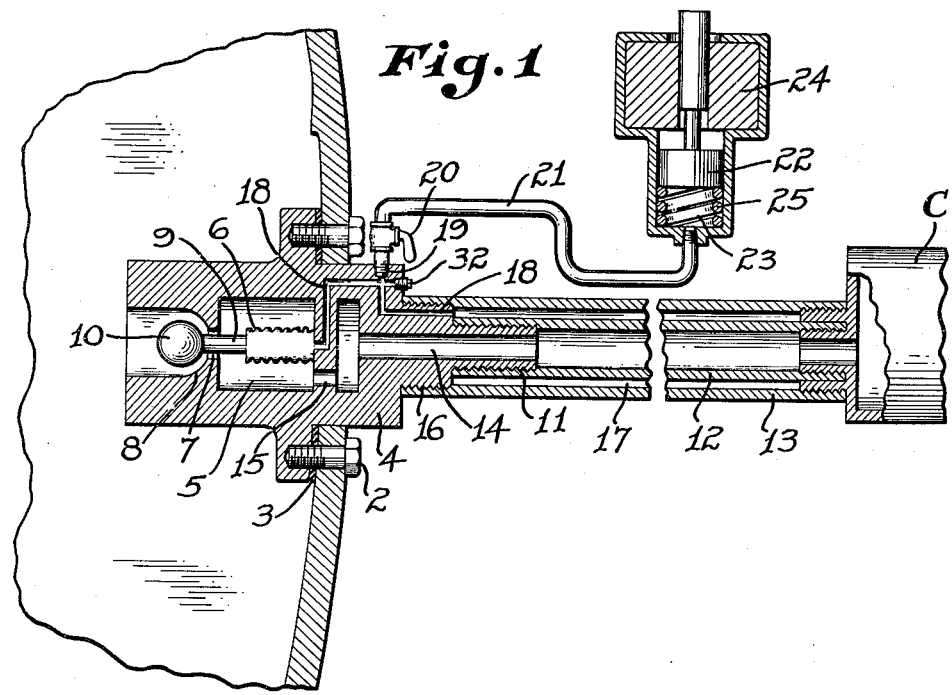
Figure 1 is a cross section showing a valve constructed in accordance with my invention.

Referring to the drawings, a valve constructed in accordance with my invention has a body 4 mounted in the opening on a supply tank 1 by means of the bolts 2 and is made gas tight by the rubber gaskets 3. The body 4 has therein a chamber 5. At one end of the chamber 5 is attached a bellows 6. At one end of the chamber 5 is a valve port 7 leading into the interior of the tank 1 and surrounding the port 7 is a ball valve seat 8. A connecting rod 9 attaches the valve 10 to the bellows 6. Threaded at 11 to the body 4 is a delivery pipe 12 which communicates through the passages 14 and 15 with the chamber 5. This delivery pipe 12 can be either the pipe to deliver the butane from the interior of the tank to the carburization system C of a motor vehicle or can be the delivery pipe from a storage tank at a service station to the tank on a motor vehicle.

Surrounding the delivery pipe 12 is a second pipe 13 which is threaded to the housing at 16 and to the carburization system C. Both pipes are made air and liquid tight and the cavity 17 between the pipes 12 and 13 is filled with an inert fluid such as water. This cavity 17 communicates with the interior of the bellows 6 by means of the passage 18. In the bellows' normal or unexpanded position the ball valve 10 seats firmly against the seat 8, closing the passage from the interior of the tank 1 to the passages 14 and 15 and the delivery pipe 12. A port 19 communicates with the passage 18 and is threaded to a valve 20 which is adapted to shut off the flow of water from the pipe 21 through the valve 20 into the passage 18. A solenoid actuated plunger 22 is operated in the chamber 23 by the electrical solenoid 24. The chamber 23, pipe 21, passages 18, bellows 6, and cavity 17 are all filled with water, and when the solenoid 24 is actuated, the piston 22 forces the water from the chamber 23 into the bellows 6, expanding the same and opening the ball valve 10, permitting butane to flow from the tank through the delivery pipe 12.

The solenoid 24 can be connected to the electrical switch on the ignition system of the motor vehicle or to a switch operated in conjunction with the turn-on faucet of the delivery pipe of a storage tank. When it is so energized and only when it is energized, the valve is opened, permitting the flow of butane. If it is deenergized, the spring 25 returns the piston 22, releasing the pressure on the water in the bellows 6 which collapses and forces the ball valve 10 into engagement with its seat 8. Similarly, if the pipe 13 is punctured in any way, the water pressure will be released, causing the bellows 6 to collapse and close the valve. Thus, if the ignition system is shut off or a puncture in the line leading to the carburization system happens, the valve is immediately closed, preventing the escape of any butane.

While I have described my valve as operated by a solenoid and piston, any mechanically operated piston connected with the water supply in the bellows 6 would actuate the same.

A test plug 32 is provided to permit testing the closure of the system in case of leakage by loosening the plug 32 to permit escape of fluid sufficient to close the valve 10.

Figure 2:
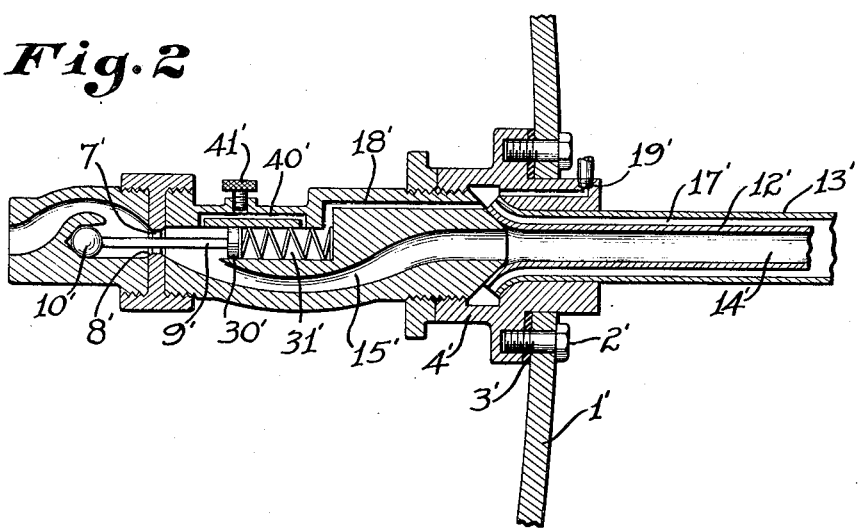
Figure 2 is a cross section of a modification of my invention.

In the modification shown in Figure 2, other than a change in the shape of the parts, the only difference is to provide a spring-loaded piston 30' actuated in a cylinder 31' to which the water pressure from the cavity 17' enters. The threaded port 19' communicates with the cylinder 31' and permits the use of the solenoid activated piston to place pressure on the water in the passages 14' and 15'.

In Figure 2 I show a modification which consists of a port 40' connecting the passage 15' with the passage 18'. In this port is positioned a control valve 41' to regulate the volume of fluid passing through the port 40'. By using this modification, the volume of fluid passing from passage 15' to 18' is regulated to a few drops per minute and this leakage will balance the pressures in the cylinder 31' and passage 15' and the spring 42' will hold the valve open. Of course, with this modification any leakage in the control line 17' will have to exceed the volume passing through the port 40' before the valve will close.

Another modification of my invention, shown in Figure 3, consists of a bellows 43 mounted in the tank 1 and connected to the pipe 21. In this modification the solenoid 24 and piston 22 are not used and the pressure of the fluid in the tank 1 compresses the bellows equalizing the pressure in the control system and bellows 6 with the pressure in the tank 1. A small spring in the bellows 6 will hold the valve 10 open unless the control system is punctured.

While I have described the preferred embodiment of my invention, I am not to be limited to any of the details herein set forth except as described in the following claims.

I claim:

1. In an automatic safety valve closure system, a tank, a body attached to said tank, a passage through said body connecting the interior of said tank with a delivery pipe, a valve in said body adapted to open and close said passage, a bellows connected to said valve to actuate the same and adapted to hold said valve closed when said bellows is under normal interior pressure, said valve and said bellows being enclosed in said tank, and fluid means attached to said bellows to expand it by means of increasing said interior pressure whereby when said pressure is released, said valve will be closed.

2. In an automatic safety valve closure system, a tank, a body attached to said tank, a passage through said body connecting the interior of said tank with a delivery pipe, a valve in said body adapted to open and close said passage, said valve enclosed in said tank, a piston carried in a cylinder in said body to actuate said valve and adapted to hold said valve closed when the fluid pressure in said cylinder is normal, and fluid means connecting with said cylinder to move said piston and open said valve by increasing said pressure whereby when said pressure is released, said valve will be closed.

3. In an automatic safety valve closure system, a tank, a body attached to said tank, a passage through said body connecting the interior of said tank with a delivery pipe, a valve in said body adapted to open and close said passage, a bellows connected to said valve to actuate the same and adapted to hold said valve closed when said bellows is under normal interior pressure, said valve and said bellows being enclosed in said tank, a pipe surrounding said delivery pipe filled with an inert fluid and attached to said body, a passage connecting said fluid with said bellows, and means for increasing the pressure on said fluid to open said valve.

4. In an automatic safety valve closure system, a supply tank, a receiving receptacle, a valve body having a valve in said tank and having means extending from said tank to connect thereto a pair of concentric ducts, an inner duct connected to said valve body and to said receiving receptacle, an outer duct connecting said valve body and said receiving receptacle and surrounding said inner duct to form a chamber between said ducts, means actuated by said pressure to open said valve and port fluid from said tank to said inner duct.

5. In an automatic safety valve closure system, a supply tank, a receiving receptacle, a valve body having a valve in said tank and having means extending from said tank to connect thereto a pair of concentric ducts, an inner duct connected to said valve body and to said receiving receptacle, an outer duct connecting said valve body and said receiving receptacle and surrounding said inner duct to form a chamber between said ducts, means actuated by said pressure to open said valve and port fluid from said tank to said inner duct, and means for supplying pressure to said chamber.

RALPH R. PROCTOR.

REFERENCES CITED

The following references are of record in the file of this patent:

UNITED STATES PATENTS

| Number | Name | Date |
| --- | --- | --- |
| 2,224,844 | MacFarren | Dec. 17, 1940 |
| 2,280,140 | Wilson | Apr. 12, 1942 |